US008152032B2

(12) United States Patent  (10) Patent No.: US 8,152,032 B2
Tardif  (45) Date of Patent: Apr. 10, 2012

(54) CAP FOR A CONDIMENT CONTAINER

(75) Inventor: Pierre Tardif, Longueuil (CA)

(73) Assignee: Trudeau Corporation 1889 Inc., Boucherville, Quebec (CA)

( * ) Notice: Subject to any disclaimer, the term of this patent is extended or adjusted under 35 U.S.C. 154(b) by 732 days.

(21) Appl. No.: 12/336,756

(22) Filed: Dec. 17, 2008

(65) Prior Publication Data
US 2010/0147900 A1    Jun. 17, 2010

(51) Int. Cl.
*B65D 5/72* (2006.01)
(52) U.S. Cl. .............................. 222/498; 222/565
(58) Field of Classification Search ............ 222/498, 222/565, 142.1–142.9, 196.1–196.5; 220/281; 215/317, 334
See application file for complete search history.

(56) References Cited

U.S. PATENT DOCUMENTS

| 2,937,793 | A | * | 5/1960 | Cornelius | 222/148 |
| 3,934,745 | A | * | 1/1976 | Lovell | 215/224 |
| 4,423,824 | A | * | 1/1984 | Varndell | 220/281 |
| 4,500,006 | A | * | 2/1985 | Lafortune et al. | 215/224 |
| 5,597,096 | A | | 1/1997 | Jeppesen et al. | |

* cited by examiner

*Primary Examiner* — Lien Ngo
(74) *Attorney, Agent, or Firm* — Michael Best & Friedrich LLP

(57) ABSTRACT

The invention provides a cap for a container for storing condiments for human consumption. The cap comprises a member having a top portion with a peripheral wall that has means for retaining the cap onto the container extending downwardly for covering the mouth of the container, the top portion having dispensing openings for allowing passage of the condiments. The cap comprises a seal having a top portion comprising a central portion, a flange portion extending around the central portion for overlapping the dispensing openings of the member and a central peripheral wall extending downwardly from the top portion and having a lower end mountable to the member. In use, the seal is moveable between a closed position, wherein the flange portion covers the dispensing openings for preventing passage of the condiments outwards from the interior of the container, and an open position, wherein the flange portion and the flange portion frees the dispensing openings for allowing passage of the condiments outwards from the interior of the container.

47 Claims, 5 Drawing Sheets

CAP FOR A CONDIMENT CONTAINER

FIELD OF THE INVENTION

The present invention relates to a cap for a condiment container.

BACKGROUND OF THE INVENTION

Condiment containers such as salt shakers traditionally have caps with dispensing openings provided therein to allow the escape of condiments through the cap when the container is inverted. The condiment container can thus be used to spread condiments over, e.g., a meal by inverting the container over the meal to allow the condiment from escaping through the cap onto the plate.

With condiment containers that have exposed dispensing openings, condiments may escape accidentally if the container is tilted or tipped unwillingly. Furthermore, the open dispensing openings allow the entry of humidity, dust and other impurities into the condiment container which may soil the condiments. As such, caps for condiment containers that provide a closing mechanism are preferred to those that do not.

U.S. Pat. No. 5,597,096 provides a shaker for condiments with a cap that can open and close. The cap has an arcuate form and can be opened by a user by pressing on the apex of the form. When opened, the cap arches upwards and reveals dispensing openings. This cap, however, suffers from multiple drawbacks. For example, it is only mountable on a shaker having an integral mounting bead along the mouth.

In the context of the above, it can be appreciated that there is a need in the industry for an improved cap for a condiment container.

SUMMARY OF THE INVENTION

In accordance with a first broad aspect, the present invention provides a cap for a container defining an interior for storing condiments for human consumption and having an upper portion defining a mouth. The cap comprises a member having a top portion with a peripheral wall extending downwardly for covering the mouth of the container, the peripheral wall having means for retaining the cap onto the container, the top portion having a plurality of dispensing openings for allowing passage of the condiments. The cap further comprises a seal having a top portion comprising a central portion, a flange portion extending around the central portion for overlapping the dispensing openings of the member, and a central peripheral wall extending downwardly from said top portion and having a lower end mounted to the member. In use, the seal is moveable between a closed position, wherein the central portion is above the flange portion and the flange portion covers the dispensing openings of the member for preventing passage of the condiments outwards from the interior of the container, and an open position, wherein the central portion is below the flange portion and the flange portion frees the dispensing openings of the member for allowing passage of the condiments outwards from the interior of the container.

In accordance with a second broad aspect, the present invention provides a cap for a container defining an interior for storing condiments for human consumption and having an upper portion defining a mouth. The cap comprises a member having an inner portion and an outer portion, the inner portion having a top portion with a peripheral wall extending downwardly for covering the mouth of the container, the peripheral wall of the inner portion having means for retaining the cap onto the container, the top portion of the inner portion having a plurality of openings for allowing passage of the condiments, the outer portion having a top portion with a peripheral wall extending downwardly for covering at least partially the peripheral wall of the inner portion, the top portion of the outer portion having a plurality of dispensing openings for allowing passage of the condiments outwards from the interior of the container. The cap further comprises a seal having a top portion comprising a central portion, a flange portion extending around the central portion for overlapping the dispensing openings, and a central peripheral wall extending downwardly from said top portion and having a lower end mounted to the member. In use, the seal is moveable between a closed position, wherein the central portion is above the flange portion and the flange portion covers the dispensing openings of the outer portion for preventing passage of the condiments outwards from the interior of the container, and an open position, wherein the central portion is below the flange portion and the flange portion frees the dispensing openings for allowing passage of the condiments outwards from the interior of the container.

In accordance with a third broad aspect, the present invention provides a cap for a container defining an interior for storing condiments for human consumption and having an upper portion defining a mouth. The cap comprises a member having an inner portion and an outer portion, the inner portion having a top portion with a peripheral wall extending downwardly for covering the mouth of the container, the peripheral wall of the inner portion having means for retaining the cap onto the container, the top portion of the inner portion having a plurality of openings for allowing passage of the condiments, the outer portion having a top portion with a peripheral wall extending downwardly for covering at least partially the peripheral wall of the inner portion, the top portion of the outer portion having a central opening encircling a vertical axis of the cap and a plurality of dispensing openings for allowing passage of the condiments outwards from the interior of the container. The cap further comprises a seal having a top portion comprising a central portion, a flange portion extending around the central portion for overlapping the dispensing openings, and a central peripheral wall extending downwardly from a peripheral live hinge, passing through the central opening of the outer portion and having a lower end mounted to the member, the seal being in a closed position when the flange portion covers the dispensing openings of the outer portion for preventing passage of the condiments outwards from the interior of the container and the seal being in an open position when the flange portion frees the dispensing openings of the outer portion for allowing passage of the condiments outwards from the interior of the container; wherein, in use, when the seal is in the closed position and a user presses on the central portion, downward movement of the central portion below the peripheral live hinge imparts upward movement of the flange portion above the peripheral live hinge such that the seal is in the open position and the central portion is at least partially located within the central peripheral wall, and when the user presses afterwards on the flange portion, downward movement of the flange portion below the peripheral live hinge imparts upward movement of the central portion above the peripheral live hinge such that the seal returns in the closed position.

These and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided hereinbelow with reference to the following drawings, in which.

Figure 1A:
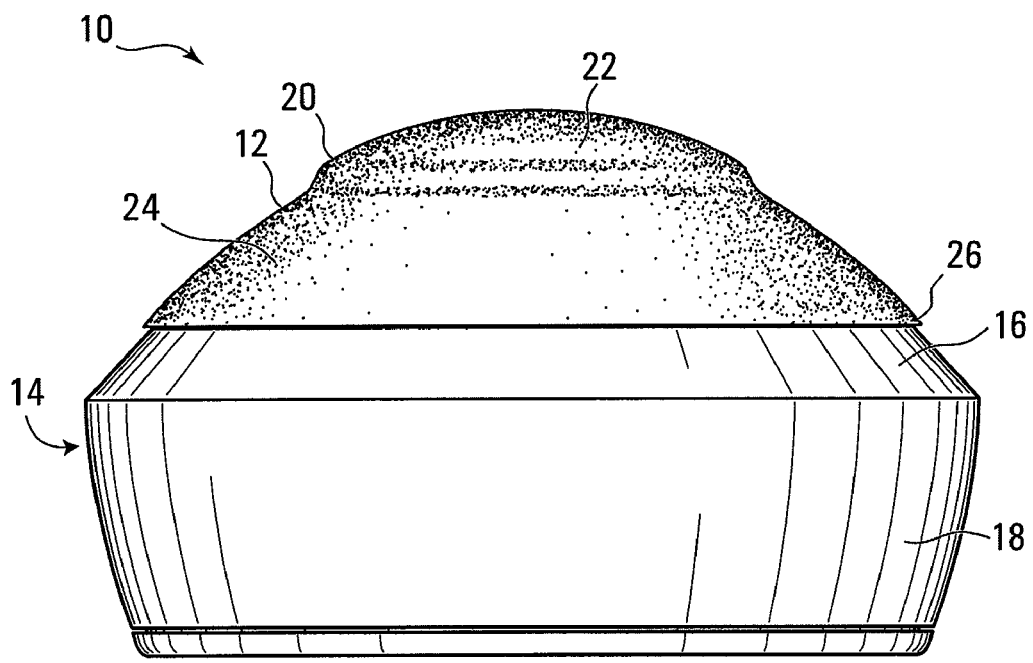
FIG. 1A is a side elevation view of a cap in accordance with an embodiment, the seal being shown in a closed position.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE EMBODIMENTS

FIG. 1A shows a cap 10 for a condiment container such as a salt shaker. In a non-limiting example, the cap is suitable for fastening to a container having an upper portion with a peripheral wall defining a mount and an interior for receiving condiments.

Unless explicitly or implicitly suggested otherwise, the various elements described herein are described from the perspective of a condiment container, such as a salt shaker, that is standing upright on a flat surface and onto which the cap is affixed at a top portion. As such, orientationally descriptive terms such as 'upward', 'top', 'vertical' or 'upper', will generally refer to this particular frame of reference. However, it should be understood that this orientation is used only as an example to facilitate understanding of the invention, but that the invention is not limited to any particular orientation of its elements. For example, although the mouth of the container described above is described as being defined at an upper portion of the container, it should be understood that the container could be reoriented or otherwise shaped such that the portion defining the mouth is no longer "up" without departing from the intended scope of the invention.

The cap 10 comprises a seal 12 and a member 14. The member 14 comprises a top portion 16 and a peripheral wall 18 extending downwardly from the top portion 16. In this exemplary view, the peripheral wall 18 is circular in cross-section; however it should be understood that the peripheral wall 18 of the member 14, and indeed, all parts of the cap 10 and the cap 10 itself may vary in shape and size and that the invention is not intended to be limited to the particular shape shown in the figures. The cap 10 is suited for attachment to a condiment container at a mouth of the condiment container by any appropriate retaining mean. When the cap is attached to the container, the peripheral wall of the member is said to cover the mouth of the container. In a non-limiting example, the peripheral wall of the member has threads 92 and can be twisted onto a suitably threaded container, however the particular retaining means used is not meant to limit the invention and in any arrangement when the mouth of the container is covered by the cap, it is said that the peripheral wall of the member covers the mouth of the container.

Figure 3:
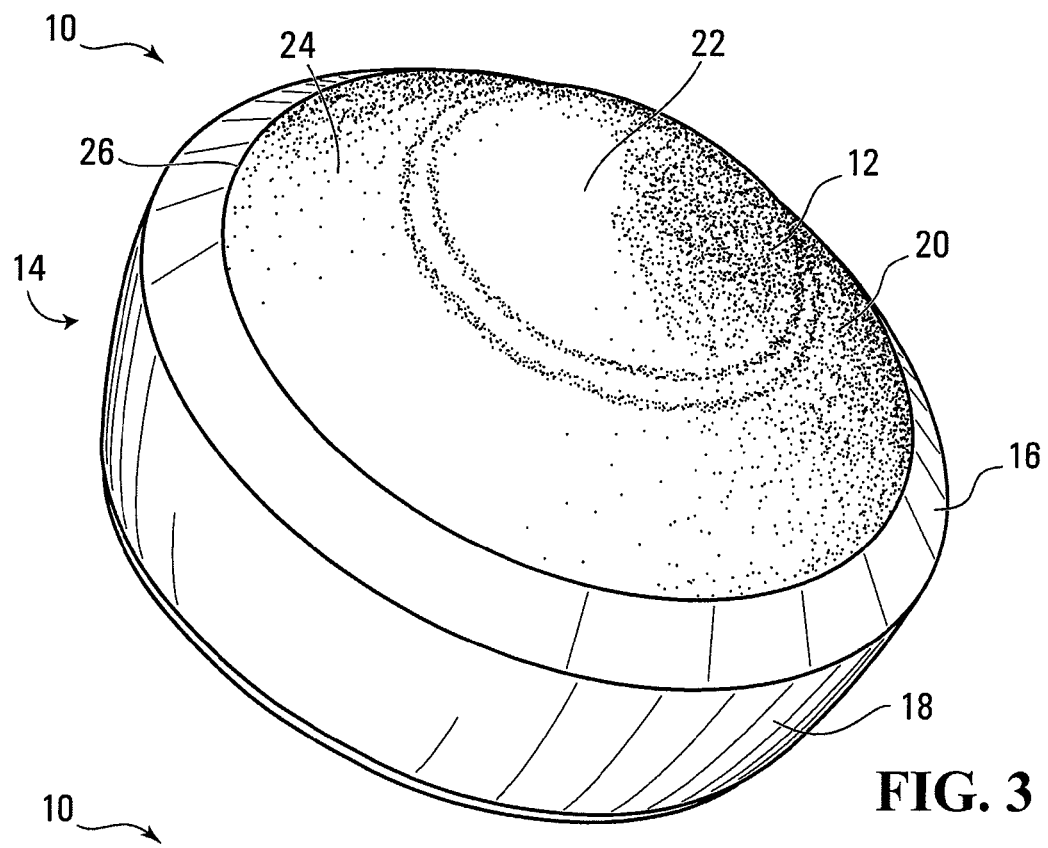
FIG. 3 is a top perspective view of the cap shown in FIG. 1A, the seal being shown in the closed position.

The seal 12 comprises a top portion 20, which is the only portion of the seal 12 visible in FIG. 1A. The top portion 20 comprises a central portion 22 and an annular flange portion 24 extending around the central portion 22. As best seen in FIG. 3, in this particular example, the seal 12 has a substantially circular circumference.

Figure 1B:
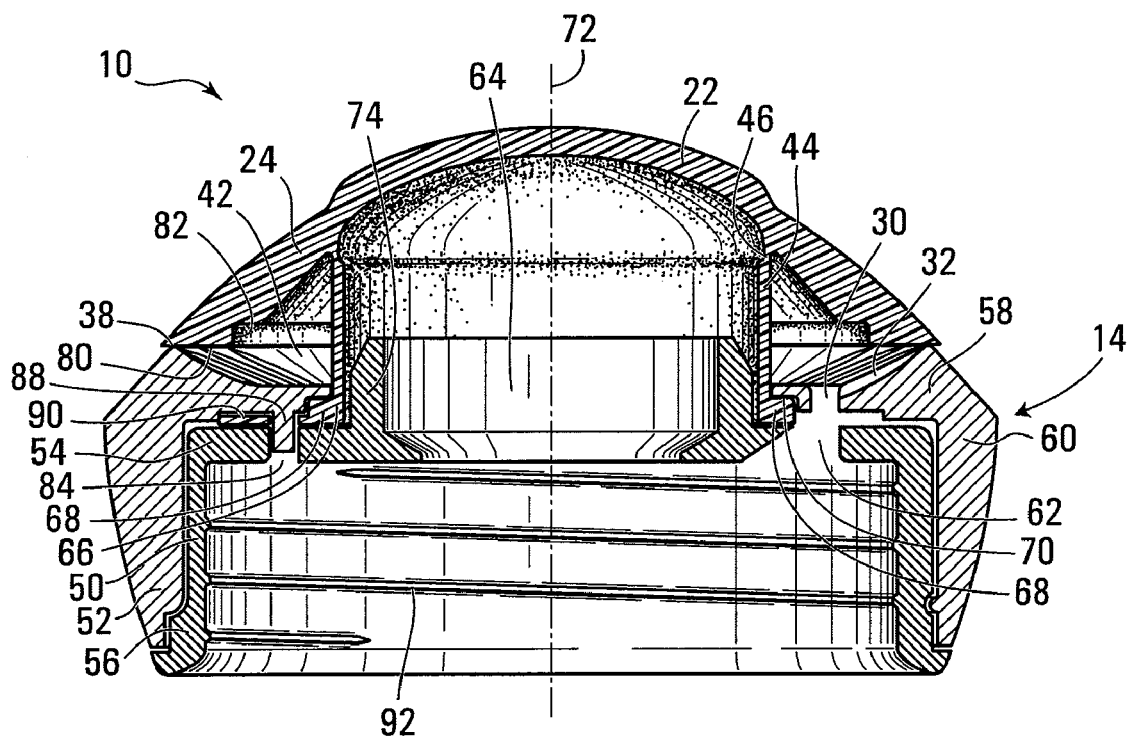
FIG. 1B is a cross-sectional view of the cap shown in FIG. 1A.

The central portion 22 is substantially circular and is surrounded by the flange portion 24. FIGS. 1A, 1B and 3 show the seal 12 in a closed position. In the closed position, the seal 12 adopts a substantially convex form, so called because from a perspective outside of the cap 10 and the container, the seal 12 swells outwards. At least an area 28 within the top portion 16 of the member 14 is covered by the seal 12 when the seal 12 is in the closed position.

Figure 4:
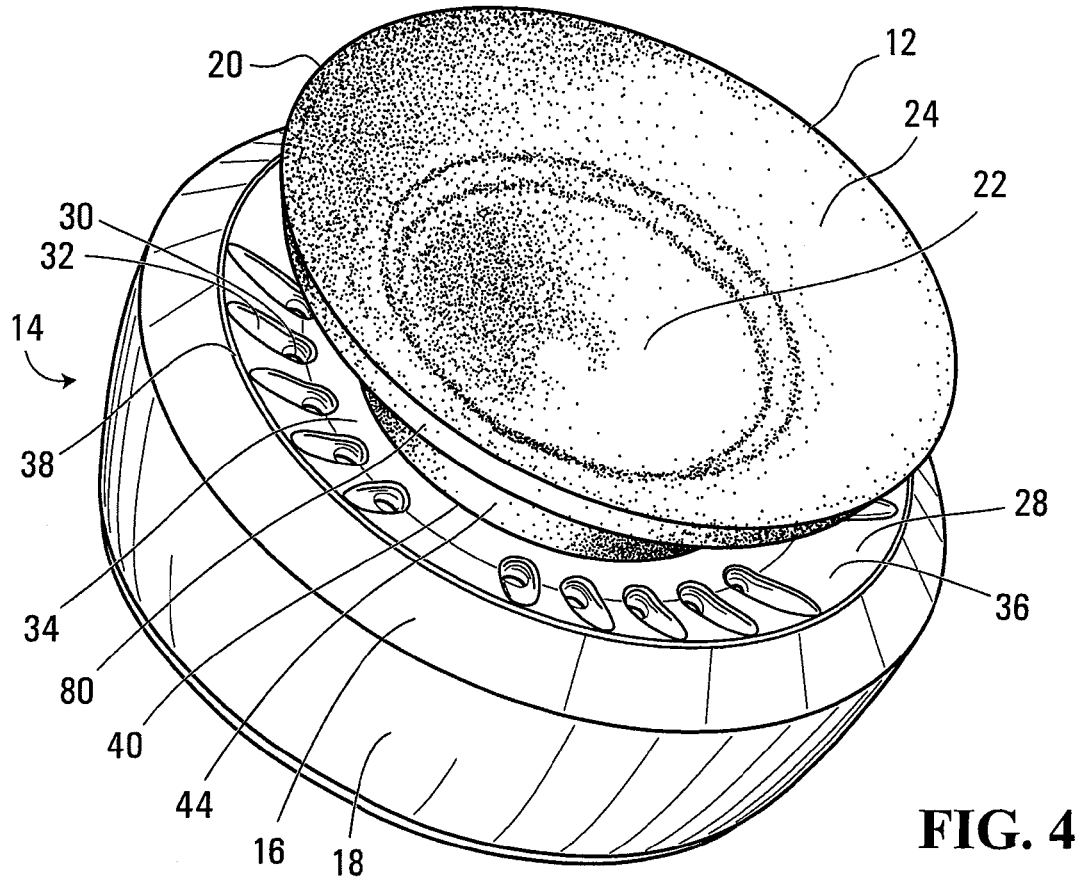
FIG. 4 is a top perspective view of the cap shown in FIG. 1A, the seal being shown in the open position.

As seen in FIG. 4, the area 28 is a peripheral surface which surrounds a central opening 40 provided in the member. The peripheral surface comprises a plurality of dispensing openings 30. The dispensing openings 30 can be located anywhere on the member 14 but are preferably on the top portion 16 thereof and preferably still on the peripheral surface. When not blocked, the dispensing openings 30 allow the passage of condiments through the member 14, for example from the interior of a container attached to the cap 10 outwards. The peripheral surface comprises a flat section 34, an inclined section 36 and a crest 38. The inclined section 36 extends upwardly from the flat section to the crest 38. Although the flat section 34, inclined section 36 and crest 38 are shown here as three discrete section, they can be merely portions of a continuum, and even infinitesimal such portions. For example, the flat section 34 and the inclined section 38 could form a continuous curve from the central opening 40 up to the crest 38. Also, while the crest 38 is shown here as a circular peak, it should be understood that it could be any section of any shape located upwardly from the flat section 34, such as a flat section extending outward from the inclined section 36 or even an inclined continuation of the inclined section 36.

The area 28 is said to be covered or overlapped by the seal 12 because the seal 12 blocks it and makes it inaccessible. In this non-limiting example, the top portion 20 forms a seal around this area. It should be understood that it is not necessary for there to be direct contact between the seal and the area 28 for it to be considered covered. Rather, it must merely be blocked e.g. in such a manner that condiments cannot exit to the exterior through the dispensing openings 30. As seen in FIG. 1B, the top portion 20 rests against the crest 38 but leaves an open gap 42 above the inclined section 36 and the flat section 34. Nevertheless, the gap 42, flat section 34, inclined section 36 and dispensing openings 30 are considered covered by the seal 12, since they are blocked. For example, condiments such as salt cannot pass through the dispensing openings 30 and out away from the cap when the seal is in the closed position. Alternatively, the seal 12 could lay physically on the covered area 28, leaving no gap between the seal 12 and the member 14 at the area 28.

The flange portion 24 of the seal 12 comprises a lower peripheral end wall 80 for abutting against the member 14. As shown in FIG. 1B, when the seal 12 is in the closed position, the lower peripheral end wall 80 is generally horizontally flat, or aligned perpendicularly with a longitudinal axis 72 of the cap 10 and rests against the crest 38 for forming a seal for preventing exit of the condiments. As shown in FIG. 2B, when the seal is in the open position, the lower peripheral end wall 80 is, along with the rest of the flange portion 24, moved upwards from its closed-position location and no longer prevents passage of condiments outwards. The lower peripheral end wall 80 is aligned transversely with respect to the vertical axis 72 of the cap 10, not perpendicularly but rather obliquely.

The flange portion 24 comprises on its lower surface an annular indentation 82 located radially interiorly of the lower peripheral end wall 80. The annular indentation 82 is adjacent the lower peripheral end wall 80. The annular indentation 82 may reduce resilience in the material in the flange portion 24, which resilience may otherwise impede the seal 12 from adopting the closed position or the open position.

Figure 2A:
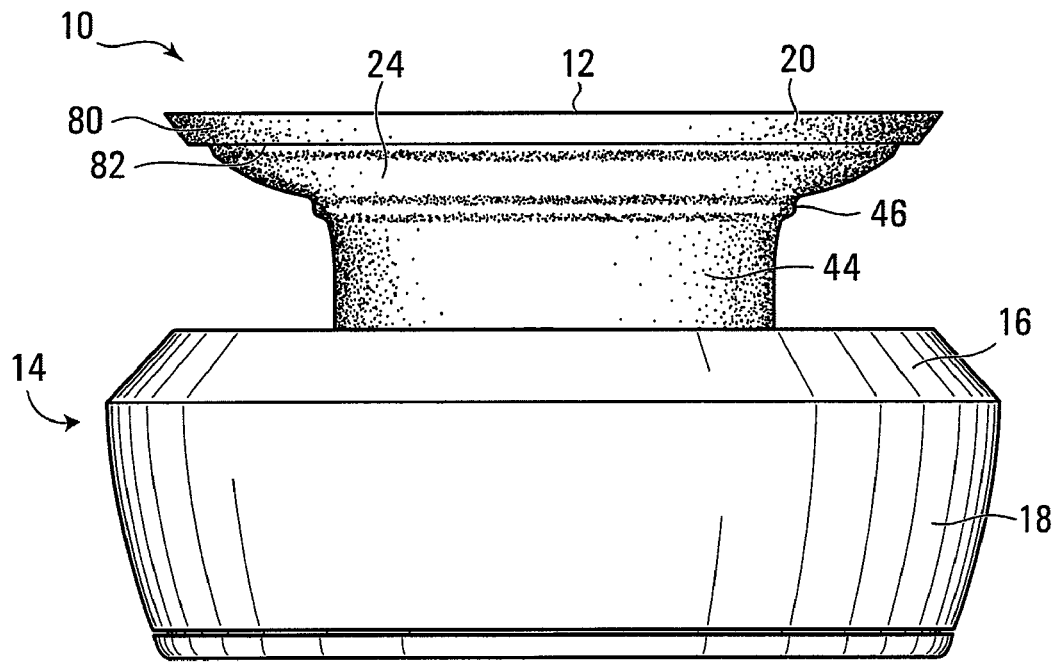
FIG. 2A is a side elevation view of the cap shown in FIG. 1A, the seal being shown in an open position.
Figure 2B:
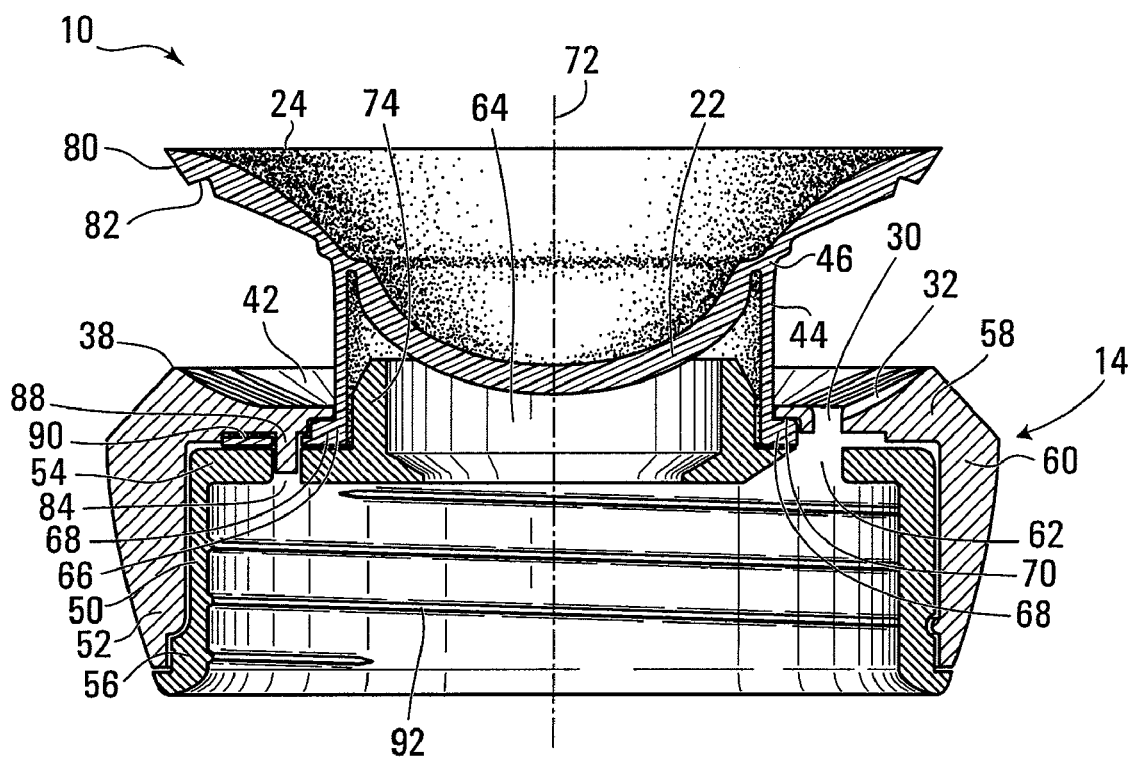
FIG. 2B is a cross-sectional view of the cap shown in FIG. 2A.

FIGS. 2A, 2B and 4 show the seal 12 in an open position. Here, the seal 12 adopts a substantially concave form, so called because it defines a depression visible from a perspective outside of the cap 10 and the container. When the seal 12 is in the open position, the area 28 of the top portion 16 of the member 14 is considered uncovered even though part of the seal 12 may lie physically above it because it is not blocked.

As mentioned above, the top portion 16 of the member 14 has the dispensing openings 30 located in the section 28 that is covered by the seal 12 when the seal 12 is in the closed position. As best seen in FIG. 4, grooves 32 are provided adjacent the dispensing openings 30. The dispensing openings 30 are each located inside a respective groove 32, each groove 32 extending outwards into the inclined section 36. When the seal 12 is in the open position, and the container is tilted, condiments contained in the container escape through the dispensing openings 30 and are guided by the grooves 32 such that they flow directly outwards. When the container is returned to the upright position, any condiment remaining on the inclined section 36 is guided by the groove 32 back into the dispensing opening 30, thus preventing the unsightly accumulation of condiment along the flat section 34. While in this example each dispensing opening 30 is located in a respective groove 32, it should be noted that many other configurations of grooves 32 and dispensing openings 30 are possible. For example, the dispensing openings 30 may be near, but not in, the grooves 32 and there may be multiple dispensing openings 30 to a groove 32.

As best seen in FIG. 2B, the seal 12 comprises a central peripheral wall 44 extending downwardly from the top portion 20 of the seal 12 at a peripheral live hinge 46. In the example shown, the central peripheral wall 44 has a generally cylindrical shape however, other shapes are possible. The central peripheral wall 44 has a lower end 66 to be mounted to the member 14. The peripheral live hinge 46 allows movement of the top portion 20 of the seal 12 with respect to the central peripheral wall 44. The peripheral live hinge 46 defines an area of reduced thickness with respect to the central peripheral wall 44, although any configuration providing adequate hinging could be used. The live hinge 46 connects the central peripheral wall 44 to the underside of the top portion 20 of the seal 12 around the periphery of central portion 22.

As mentioned above, the top portion 20 of the seal 12 adopts a substantially concave form when in the closed position and a substantially concave form when in the open position. As seen in FIGS. 1A and 1B, when the seal 12 is in the closed position, the flange portion 24 extends downwardly from the central portion 22. As best seen in FIG. 2B, when the seal 12 is in the open position, the flange portion 24 extends above the central portion 22 and the central portion 22 is located within the central peripheral wall 44.

When a user presses on the central portion 22, the central portion 22 moves downwards below the level of the live hinge 46. As best seen in FIG. 2B, the central portion 22 moves into the cylindrical form defined by the central peripheral wall 44 of the member. When the central portion 22 is pushed downwards, resilience in the material of the top portion 20 of the seal 12 causes the flange portion 24 to move upwards above the live hinge 46. As a result, the top portion 20 of the seal 12 adopts the convex form characteristic of the open position of the seal 12. In order to return the seal 12 to the closed position, a user moves the flange portion 24 downwards towards its closed-position arrangement. Resilience in the material of the top portion 40 of the seal 12 causes the central portion 22 to move upwards above the live hinge 46 and return to the open-position arrangement.

It should be noted that the central peripheral wall 44 and the peripheral live hinge 46 can be made of any suitable material and do not need to be of the same material as the top portion 20 of the seal 12. For example, the central peripheral wall 44 and/or the peripheral live hinge 46 could be made of different materials, e.g. by overmolding. However, in the example shown here, the central peripheral wall 44, live hinge 46 and top portion 20 of the seal 12 together form an integral piece made of a soft single flexible material with a good shape memory. For example, the seal can be made of injection molded silicone, compression molded silicone, thermoplastic rubber (TPR) or natural rubber.

The lower end 66 of the central peripheral wall 44 is affixed to the member 14 in an area adjacent the central opening 40. Preferably, the central peripheral wall 44 may be affixed to the member 14 in such a way as to block or seal the central opening 40, if present, such that condiments cannot pass through the central opening 40. In the example shown, the central peripheral wall 44 passes through at least a part of the central opening 40 and the lower end 66 is held against a bottom surface of the member 14 such that condiment cannot escape through the central opening 40. In this example, condiments can enter the cylindrical form of the central peripheral wall 40, but then find no opening through which to escape to the exterior. The central peripheral wall 44 can be affixed to the member 14 by any suitable means. For example, the lower end 66 of the central peripheral wall 14 can be glued to the member 14 or held by friction.

Figure 5:
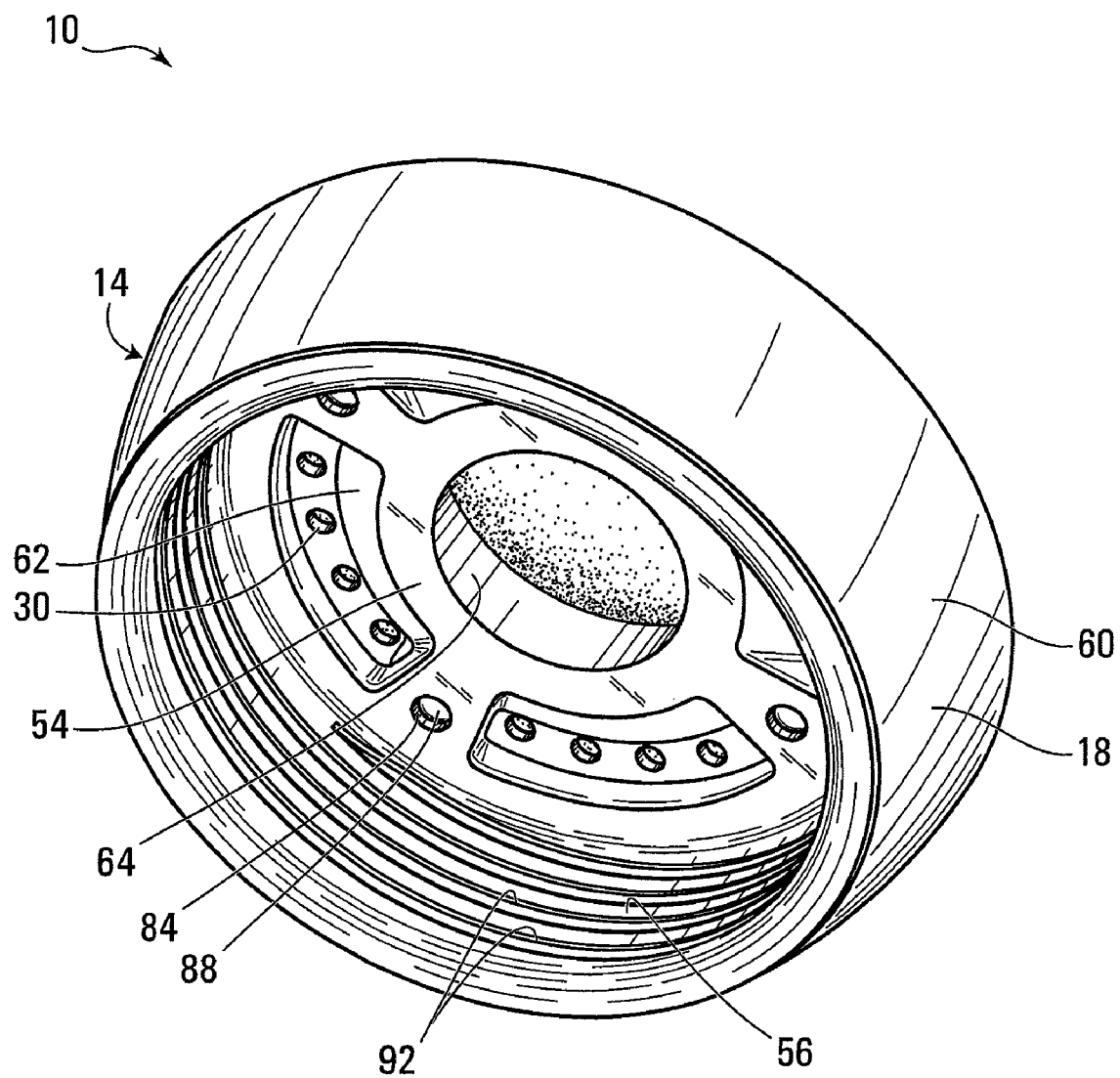
FIG. 5 is a bottom perspective view of the cap shown in FIG. 1A.

The member 14 may be a single integral piece or may be made of two or more pieces. As best shown in FIGS. 1B, 2B and 5, the member 14 is made up of an inner portion 50 and an outer portion 52. The inner portion 50 has a top portion 54 and a peripheral wall 56 that extends downwardly from the top portion 50. In a non limiting example, the peripheral wall 56 of the inner portion 50 comprises threads 92 disposed on the inside thereof that match treads on the outside surface of the container for attaching the cap 10 thereto.

The outer portion 52 has a top portion 58 and a peripheral wall 60 that extends downwardly from the top portion 58 and may make up a portion of the peripheral wall 18 of the member 14. In a non-limiting example, the peripheral wall 60 of the outer portion 52 covers at least partially the peripheral wall 56 of the inner portion, as shown in FIGS. 1B and 2B.

The outer portion 52 comprises the dispensing openings 30, the area 28 having the peripheral surface, the grooves 32 and the central opening 40. As seen in FIG. 5, in order for condiments to be able to exit through member 14 at the dispensing openings 30, the inner portion 50 comprises a plurality of openings 62 adjacent with the dispensing openings 30 of the outer portion 52. It is not necessary for the openings 62 of the inner portion 50 to be similar in shape, size or quantity as the dispensing openings 30 of the outer portion, rather it is merely necessary for at least a portion of the dispensing openings 30 to be aligned with at least a portion of the openings 62 such that condiments can flow out through the member 14. As seen in FIG. 5, the openings 62 of the inner portion 50 are much larger than the dispensing openings 30 of the outer portion, each being aligned with four dispensing openings 30.

In the example where member 14 is made of the inner and outer portions 50, 52, a central opening 64 could be provided in the inner portion 50, as shown in FIGS. 1B and 2B. The central opening 64 is generally circular and encircles the vertical axis 72 of the cap 10. The central opening 64 may allow passage of air downward into the container and out through the dispensing openings 30. Thus, as the central portion 22 of the seal 12 is being pushed downwards to move the seal 12 from the closed position to the open position, the air occupying the space enclosed between the central portion 22, the central peripheral wall 44 and the member 14 can escape through the central opening 64, thus avoiding an increase in pressure that would resist the downward motion of the central portion 22. Likewise, the air flow enabled by the central opening 64 also facilitates movement of the seal 12 from the open position to the closed position by preventing a decrease of pressure that would result from moving the central portion 22 upwards and increasing the volume of space between the central portion 22, the central peripheral wall 44 and the member 14, which decrease in pressure would resist the movement of the central portion 22 upwards. It should be appreciated however, that it is not necessary to provide central opening 40, and that other means could be provided for allowing airflow. For example, holes in the top portion of the seal could be provided.

The central peripheral wall 44 passes through the central opening 40 of the outer portion 52. The central peripheral wall 44 has a peripheral ring 68 at the lower end 66. The peripheral ring 68 can be a simple enlargement of the diameter of the central peripheral wall 44 or any other form that projects radially outwards therefrom. The term peripheral "ring" is used here because in this non-limiting example the central peripheral wall 44 is cylindrical and the peripheral ring 68 follows the contour of the central peripheral wall 44, thus defining a ring-like shape. However it should be understood that the peripheral ring 68 can be any form that projects outwards from the central peripheral wall 44, not necessarily following the shape of the central peripheral wall 44 which in any case does not necessarily have to be cylindrical in form. While the peripheral ring 68 is disposed around the periphery of central peripheral wall 44 at the lower end, it does not necessarily need to follow the entire periphery of central peripheral wall 44, and may be present only on a section or sections thereof.

As shown in FIGS. 1B and 2B, the central peripheral wall 44 passes through the central opening 40 of the outer portion 52 and rests against the inner periphery of the central opening 40. The peripheral ring 68 is below the outer portion 52 and projects radially outwards beyond the central opening 40. As such, the peripheral ring 68 abuts against a bottom surface 70 of the top portion 58 of the outer portion 52 and prevents movement of the seal 12. In addition, the top portion 54 of the inner portion 50 rests against the peripheral ring 68 from beneath, such that the peripheral ring 68 is sandwiched between the bottom surface 70 of the top portion 58 of the outer portion 52 and the top portion 54 of the inner portion 50. The seal 12 is thus securely held in place with respect to the member 14.

Figure 6:
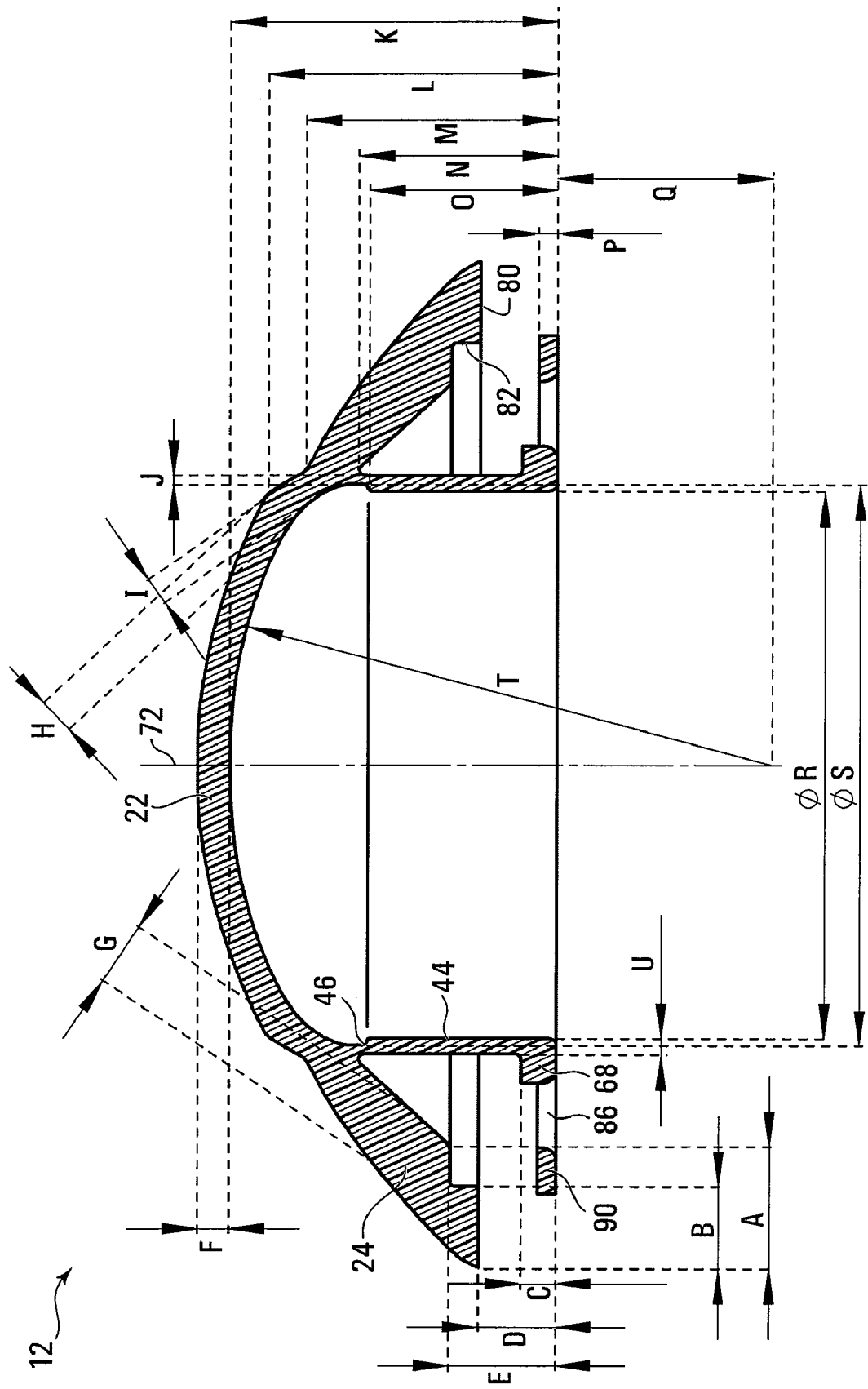
FIG. 6 is a cross-sectional of the seal of the cap shown in FIG. 1A.

As seen in FIGS. 1B, 2B and 6, the peripheral ring 68 can include one or more projection 90 with a hole 86. The projection 90 may project radially outwards beyond the rest of the peripheral ring 68 and may receive within the hole 86 a pin 88 projecting downwardly from the outer portion 52. Where the peripheral ring 68 is sandwiched between a bottom surface 70 of the top portion 58 of the outer portion 52 and the top portion 54 of the inner portion 50, the hole 86 receives the pin 88 projecting downwardly from the bottom surface 70. Four projections 90 can be included in the peripheral ring 68 located at four equidistant points on the peripheral ring 68; although more or less projections 90 could be provided. For each projection 90, a pin 88 is provided on the outer portion 52 so as to align with the projection 90. Optionally, in the top portion 54 of the inner portion 50, holes 84 are provided to accommodate the respective pins 88, such that each pin 88 can pass through the respective holes 86, 84 (see FIGS. 1B, 2B and 5). Although the pin 88 was described as projecting downwards from the bottom surface 70 of the top portion 58 of the outer portion 52, it will be readily appreciated that the pin 88 could equally project upwards from the top portion 54 of the inner portion 50 and that accordingly, corresponding hole could be located in the outer portion 52. Alternatively in the non-limiting embodiment where the member 14 is made of a single piece, pins projecting downwardly from the bottom surface of the member 14 can be received in the respective holes 86 of the seal 12. Advantageously, the projection 90 and pin 88 combination impedes rotational motion of the seal 12 relative to the member 14.

The central opening 40 of the outer portion 52 overlaps at least partially the central opening 64 of the inner portion 50 so that air can flow as described above. Optionally, the top portion 54 of the inner portion 50 comprises a projection 74 extending upwardly inside the volume enclosed by the central peripheral wall 44 of the seal 12. Preferably, the projection 74 follows at least partly the inner contour of central peripheral wall 44. The projection 74 may rest against the interior surface of central peripheral wall 44 and so hold the central peripheral wall 44 against the inner periphery of central opening 40 of the outer portion 52, as best shown in FIGS. 1B and 2B. The projection 74 extends upwards past the top portion 58 of the outer portion 52 and supports the central peripheral wall 44.

The inner portion 50 and the outer portion 52 can be connected in any suitable manner. Their connection can be permanent or releasable. For example, they can be glued together. In another example, the inner portion 50 and the outer portion 52 are held together by friction-fit arrangement.

A protrusion and a complementary recess combination can be provided on the inner portion and outer portion to prevent movement of the inner portion and outer portion relative to one another in the vertical direction. The protrusion and complementary recess can follow the curvature of the inner and outer portions 50, 52 respectively and impede translational movement of the inner portion 50 relative to the outer portion 52 along the vertical axis. Additional protrusions and complementary recesses can be provided to prevent other motion between the inner and outer portions 50, 52. Vertical protrusions extending vertically along the interior surface of the outer portion and complementary vertical recesses extending vertically along the exterior surface of the inner portion can be provided. Four such vertical protrusions and corresponding complementary recess combinations can be provided along the contour of the respective inner and outer portions 50, 52, each of which can be aligned with the hole 84 of the inner portion 50 which may facilitate visual alignment of the inner portion 50 with the outer portion 52 for insertion therein. Vertical protrusions and corresponding complementary recesses may prevent rotational motion of the inner portion 50 relative to the outer portion 52, particularly when twisting the cap 10 on or off a container. It will be appreciated that these protrusions and complementary recesses could be inverted, the protrusions being on the inner portion 50 and the complementary recesses on the outer portion 52.

FIG. 6 is a cross-sectional view of a seal 12 with various thicknesses of materials indicated. The table below indicates the values of dimensions referred to by the variables in FIG. 6. The entries in the table indicate a range of possible values for each variable and at least one preferred value.

| Variable | Range | | Preferred |
| --- | --- | --- | --- |
| | Lower End (mm) | Upper End (mm) | Value (mm) |
| A | 4.70 | 5.80 | 5.25 |
| B | 3.00 | 5.00 | 3.53 |
| C | 1.30 | 1.65 | 1.48 |
| D | 3.29 | 4.00 | 3.65 |
| E | 4.00 | 5.00 | 4.54 |
| F | 1.20 | 1.50 | 1.35 |
| G | 2.45 | 3.05 | 2.75 |
| H | 1.35 | 1.75 | 1.55 |
| I | 1.10 | 1.35 | 1.20 |
| J | 0.35 | 0.45 | 0.40 |
| K | 12.55 | 15.40 | 13.97 |
| L | 11.10 | 13.55 | 12.3 |
| M | 9.65 | 11.85 | 10.73 |
| N | 7.55 | 9.35 | 8.46 |
| O | 7.20 | 8.80 | 8 |
| P | 0.70 | 0.90 | 0.80 |
| Q | 8.30 | 10.20 | 9.25 |
| R | 21.05 | 25.80 | 23.43 |
| S | 21.5 | 27.5 | 24.04 |
| T | 20.85 | 25.55 | 23.22 |
| U | 0.60 | 0.80 | 0.70 |

Note that the seal can have an external diameter of between 30 millimeters and 60 millimeters. These dimensions are in no way intended to limit the invention.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A cap for a container defining an interior for storing condiments for human consumption and having an upper portion defining a mouth, said cap comprising:
   (a) a member having a central opening and a top portion with a peripheral wall extending downwardly for covering said mouth of the container, said peripheral wall having means for retaining said cap onto the container, said top portion having a plurality of dispensing openings for allowing passage of the condiments; and
   (b) a seal having a top portion comprising a central portion, a flange portion extending around said central portion for overlapping said dispensing openings of said member, and a central peripheral wall extending downwardly from said top portion and passing through said central opening of said member, said central peripheral wall having a lower end mounted to said member in an area adjacent said central opening of said member and comprising a peripheral ring extending radially outwards beyond said central opening of said member; wherein, in use, said seal is moveable between a closed position, wherein said central portion is above said flange portion and said flange portion covers said dispensing openings of said member for preventing passage of the condiments outwards from the interior of the container, and an open position, wherein said central portion is below said flange portion and said flange portion frees said dispensing openings of said member for allowing passage of the condiments outwards from the interior of the container.

2. A cap as defined in claim 1, wherein, in use, said central portion of said seal can be pressed by a user to move said seal from said closed position to said open position.

3. A cap as defined in claim 1, wherein, in use, said seal can be moved by a user from said open position to said closed position by pressing on said flange portion.

4. A cap as defined in claim 1, wherein said central opening of said member encircles a vertical axis of said cap, said vertical axis passing through said central portion of said seal.

5. A cap as defined in claim 1, wherein said central peripheral wall extends downwardly from said top portion at a peripheral live hinge.

6. A cap as defined in claim 5, wherein said central peripheral wall has a thickness of between 0.60 millimeters and 0.80 millimeters.

7. A cap as defined in claim 6, wherein said live hinge has a thickness of between 0.35 millimeters and 0.45 millimeters.

8. A cap as defined in claim 7, wherein said lower end of said central peripheral wall is affixed to said member in said area adjacent said central opening of said member.

9. A cap as defined in claim 1, wherein said peripheral ring comprises at least one projection with a hole for receiving a pin projecting downwardly from said member.

10. A cap as defined in claim 1, wherein, when said seal is in said closed position, said top portion is substantially convex and wherein, when said seal is in said open position, said top portion is substantially concave.

11. A cap as defined in claim 1, wherein said seal is made of a soft flexible material.

12. A cap for a container defining an interior for storing condiments for human consumption and having an upper portion defining a mouth, said cap comprising:
   (a) a member having an inner portion and an outer portion, said inner portion having a top portion with a peripheral wall extending downwardly for covering the mouth of the container, said peripheral wall of said inner portion having means for retaining said cap onto the container, said top portion of said inner portion having a plurality of openings for allowing passage of the condiments, said outer portion having a top portion with a peripheral wall extending downwardly for covering at least partially said peripheral wall of said inner portion, said top portion of said outer portion having a plurality of dispensing openings for allowing passage of the condiments outwards from the interior of the container;
   (b) a seal having a top portion comprising a central portion, a flange portion extending around said central portion for overlapping said dispensing openings, and a central peripheral wall extending downwardly from said top portion and having a lower end mounted to said member; wherein, in use, said seal is moveable between a closed position, wherein said central portion is above said flange portion and said flange portion covers said dispensing openings of said outer portion for preventing passage of the condiments outwards from the interior of the container, and an open position, wherein said central portion is below said flange portion and said flange portion frees said dispensing openings of said outer portion for allowing passage of the condiments outwards from the interior of the container.

13. A cap as defined in claim 12, wherein each dispensing opening is located in a groove defined in said outer portion, said groove extending outwardly such that condiments escaping through said dispensing openings are directed outwards.

14. A cap as defined in claim 12, wherein, in use, said central portion of said seal can be pressed by a user to move said seal from said closed position to said open position.

15. A cap as defined in claim 12, wherein, in use, said seal can be moved by a user from said open position to said closed position by pressing on said flange portion.

16. A cap as defined in claim 12, wherein said outer portion comprises a central opening encircling a vertical axis of said cap, said vertical axis passing through said central portion of said seal.

17. A cap as defined in claim 16, wherein said central portion of said seal is located within said central peripheral wall of said seal when said seal is in said open position.

18. A cap as defined in claim 17, wherein said inner portion comprises a central opening encircling said vertical axis of said cap for allowing air to flow through said central opening of said inner portion.

19. A cap as defined in claim 18, wherein said central peripheral wall extends downwardly from said top portion at a peripheral live hinge and passes through said central opening of said outer portion.

20. A cap as defined in claim 19, wherein said central peripheral wall has a thickness of between 0.60 millimeters and 0.80 millimeters.

21. A cap as defined in claim 20, wherein said live hinge has a thickness of between 0.35 millimeters and 0.45 millimeters.

22. A cap as defined in claim 19, wherein said lower end of said central peripheral wall is mounted to said inner portion or said outer portion in an area adjacent said central opening of said outer portion.

23. A cap as defined in claim 22, wherein said central peripheral wall passes through said central opening of said outer portion.

24. A cap as defined in claim 23, wherein said top portion of said inner portion comprises a projection extending upwardly inside said central peripheral wall of said seal.

25. A cap as defined in claim 24, wherein said lower end of said central peripheral wall comprises a peripheral ring extending radially outwards beyond said central opening of said outer portion.

26. A cap as defined in claim 25, wherein said peripheral ring is located radially outwards beyond said central opening of said inner portion such that it is sandwiched between a bottom surface of said top portion of said outer portion and said top portion of said inner portion.

27. A cap as defined in claim 25, wherein said peripheral ring comprises at least one projection with a hole for receiving a pin projecting from either one of said inner portion or outer portion.

28. A cap as defined in claim 16, wherein said top portion of said outer portion defines a peripheral surface surrounding said central opening of said outer portion, said peripheral surface having a flat section and an inclined section extending upwardly therefrom to a crest.

29. A cap as defined in claim 28, wherein said dispensing openings are located in said peripheral surface.

30. A cap as defined in claim 29, wherein said dispensing openings are located in said flat section of said peripheral surface, said inclined surface comprising a plurality of grooves adjacent respective dispensing openings for directing condiments escaping through said respective dispensing openings outwards.

31. A cap as defined in claim 28, wherein said flange portion has a peripheral end wall that rests against said crest when said seal is in said closed position.

32. A cap as defined in claim 31, wherein said peripheral end wall is aligned perpendicularly to said vertical axis of said cap when said seal is in said closed position and wherein said peripheral wall is aligned transversely to said vertical axis of said cap when said seal is in said open position.

33. A cap as defined in claim 32, wherein said flange portion further comprises an annular indentation on the underside thereof, said annular indentation being located radially inwards from said lower peripheral wall.

34. A cap as defined in claim 33, wherein said lower peripheral wall has an annular width of between 3 millimeters and 5 millimeters.

35. A cap as defined in claim 12, wherein said top portion of said seal has a substantially circular circumference.

36. A cap as defined in claim 35, wherein said seal has a diameter of between 30 millimeters and 60 millimeters.

37. A cap as defined in claim 35, wherein said central portion of said seal is substantially circular and has a diameter of between 21.5 millimeters and 27.5 millimeters.

38. A cap as defined in claim 35, wherein said flange portion has a thickness of between 2.45 millimeters and 3.05 millimeters.

39. A cap as defined in claim 12, wherein, when said seal is in said closed position, said top portion is substantially convex and wherein, when said seal is in said open position, said top portion is substantially concave.

40. A cap as defined in claim 12, wherein said seal is made of molded silicone.

41. A cap as defined in claim 12, wherein said inner portion and said outer portion are held together by a friction fit arrangement.

42. A cap as defined in claim 12, wherein said inner portion comprises threads for securing said cap to the container.

43. A cap, as defined in claim 42, wherein said peripheral wall of said inner portion has one of a protrusion and a complementary recess provided on its outer surface and said peripheral wall of said outer portion has the other of said protrusion and said complement recess provided on its inner surface, wherein, in use, said protrusion and said complementary recess interlock so as to prevent rotational movement between said inner portion and said outer portion.

44. A cap for a container defining an interior for storing condiments for human consumption and having an upper portion defining a mouth, said cap comprising:
(a) a member having an inner portion and an outer portion, said inner portion having a top portion with a peripheral wall extending downwardly for covering the mouth of the container, said peripheral wall of said inner portion having means for retaining said cap onto the container, said top portion of said inner portion having a plurality of openings for allowing passage of the condiments, said outer portion having a top portion with a peripheral wall extending downwardly for covering at least partially said peripheral wall of said inner portion, said top portion of said outer portion having a central opening encircling a vertical axis of said cap and a plurality of dispensing openings for allowing passage of the condiments outwards from the interior of the container;
(b) a seal having a top portion comprising a central portion, a flange portion extending around said central portion for overlapping said dispensing openings, and a central peripheral wall extending downwardly from a peripheral live hinge, passing through said central opening of said outer portion and having a lower end mounted to said member, said seal being in a closed position when said flange portion covers said dispensing openings of said outer portion for preventing passage of the condiments outwards from the interior of the container and said seal being in an open position when said flange portion frees said dispensing openings of said outer portion for allowing passage of the condiments outwards from the interior of the container; wherein, in use, when said seal is in said closed position and a user presses on said central portion, downward movement of said central portion below said peripheral live hinge imparts upward movement of said flange portion above said peripheral live hinge such that said seal is in said open position and said central portion is located within said central peripheral wall, and when the user presses afterwards on said flange portion, downward movement of said flange portion below said peripheral live hinge imparts upward movement of said central portion above said peripheral live hinge such that said seal returns in said closed position.

45. A condiment container comprising a cap as defined in claim 1.

46. A condiment container comprising a cap as defined in claim 12.

47. A condiment container comprising a cap as defined in claim 44.

* * * * *